(12) United States Patent
Choo et al.

(10) Patent No.: US 7,734,849 B2
(45) Date of Patent: Jun. 8, 2010

(54) WIRELESS MOUSE SYSTEM CONTAINING A FLASH MEMORY

(75) Inventors: Kyung Yoon Choo, Daejeon (KR); Jang Gyu Choi, Seoul (KR); Seung Young Na, Seoul (KR); Jung Hoon Park, Seoul (KR); Sang Cheol Jeong, Seoul (KR); Hwa Se Park, Incheon (KR); Kyung Seok Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 774 days.

(21) Appl. No.: 11/605,384

(22) Filed: Nov. 29, 2006

(65) Prior Publication Data

US 2008/0048982 A1 Feb. 28, 2008

(30) Foreign Application Priority Data

Aug. 22, 2006 (KR) ...................... 10-2006-0079542

(51) Int. Cl.
*G06F 13/12* (2006.01)
(52) U.S. Cl. .......................................... 710/62; 710/63
(58) Field of Classification Search .................. 710/62, 710/63
See application file for complete search history.

(56) References Cited

U.S. PATENT DOCUMENTS

| 6,476,795 | B1 | 11/2002 | Derocher et al. | |
|---|---|---|---|---|
| 6,950,890 | B2 * | 9/2005 | Liu et al. ...................... | 710/72 |
| 7,305,224 | B2 * | 12/2007 | Chen et al. ............... | 455/343.1 |
| 2002/0024502 | A1 * | 2/2002 | Iwasaki ........................ | 345/163 |
| 2003/0217205 | A1 | 11/2003 | Chen et al. | |
| 2005/0146504 | A1 * | 7/2005 | Huang et al. ................ | 345/163 |

(Continued)

FOREIGN PATENT DOCUMENTS

CN 1598796 A 3/2005

(Continued)

OTHER PUBLICATIONS

"Universal Serial Bus Specification", Compaq et al., Internet Citation, Revision 2.0, Apr. 27, 2000, Chapters 1-5, 9 & 11, pp. 1-84, 239-274, 297-346.

(Continued)

*Primary Examiner*—Niketa I Patel
*Assistant Examiner*—David E Martinez
(74) *Attorney, Agent, or Firm*—Birch, Stewart, Kolasch & Birch, LLP

(57) ABSTRACT

The present invention relates to a wireless mouse system. Particularly, the present invention relates to a wireless mouse system in which includes a controller, which controls a receiver and a flash memory device integrated into an interfacing device, can be performed function of the receiver and the flash memory device smoothly. A wireless mouse system comprises a wireless mouse and an interfacing device with a USB terminal, electrically communicated with a USB port of a information-displaying device. The interfacing device comprises a receiver receiving a signal data transferred wirelessly from the wireless mouse, and transferring the signal data to the information-displaying device, a flash memory device exchanging data with the information-displaying device through the USB terminal and a controller controlling the receiver and the flash memory device, and transferring optionally the signal of the receiver and the flash memory device to the information-displaying device.

16 Claims, 4 Drawing Sheets

U.S. PATENT DOCUMENTS

| | | |
|---|---|---|
| 2005/0219208 A1 | 10/2005 | Eichenberger et al. |
| 2006/0007151 A1* | 1/2006 | Ram .......................... 345/163 |
| 2008/0014771 A1* | 1/2008 | Ni et al. ........................ 439/79 |

FOREIGN PATENT DOCUMENTS

| | | |
|---|---|---|
| EP | 1553481 A2 | 7/2005 |
| EP | 1739527 A2 | 1/2007 |
| KR | 2002-0001955 A | 1/2002 |
| KR | 10-2004-0072571 A | 8/2004 |

OTHER PUBLICATIONS

Tanenbaum Andrew S., "Structured Computer Organization", Prentice-Hall, Inc., 2nd Edition, pp. 10-12, 1984.

* cited by examiner

WIRELESS MOUSE SYSTEM CONTAINING A FLASH MEMORY

CROSS-REFERENCE TO RELATED APPLICATIONS

This application claims priority from Korean Patent Application No. 10-2006-0079542 filed on Aug. 22, 2006, the content of which is incorporated herein by reference in its entirety.

BACKGROUND

1. Field

The present invention relates to a wireless mouse system. Particularly, the present invention relates to a wireless mouse system which can integrate a flash memory device and a receiver of a wireless mouse into one device.

2. Background

Because a computer, a monitor, a keyboard and cables thereof are arranged separately in a confined area, the effective use of the working area is restricted. For that reason, a laptop computer is widely used in order to provide convenience and rapidity to users working in a small room, outdoors, or on the move.

The laptop computer is portable device, and thus has a pointing device, such as a touch pad or a track ball, instead of a mouse. Such a pointing device has drawbacks that the pointing speed of the pointing device is slower than that of the mouse, and that accuracy of the pointing device is lower than that of the mouse.

Therefore, a wire mouse connected to the laptop computer has been used more frequently than the pointing device. However, the connection between the laptop computer and the wire mouse is inconvenient, and the use of the wire mouse is restricted by the confined working area where the laptop computer is used. In order to resolve these problems, a wireless mouse has been developed.

FIG. 1 is a block diagram illustrating the constitution of a wireless mouse according to the related art.

Referring to FIG. 1, the wireless mouse system comprises a wireless mouse 40, a receiver 30, a computer 10, and a USB port 20. The wireless mouse 40 is operated by an independent power source.

The USB port 20 is installed on the computer 10 for connecting an internal processor of the computer 10 to an external communication device.

The receiver 30 is connected to the USB port 20, receives an operating signal from the wireless mouse 40, and transfers the operating signal to the computer 10. The operating signal of the wireless mouse 40 is inputted through the USB port 20, and the computer 10 processes the operating signal.

The wireless mouse system described above necessarily needs the separate receiver 30. Therefore, it is inconvenient to separately carry the receiver 30 as well as the wireless mouse 40.

Recently, as the use of peripheral equipments is increasing, the use of a flash memory connected to the USB port 20 is increasing.

Therefore, it is necessary for a user of the laptop computer to separately carry the flash memory as well as the laptop computer 10, the wireless mouse 40 and the receiver 30. It is inconvenient for the user to carry all of them, and also increases the probability of losing the above devices.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 4A is a perspective view illustrating that the wireless mouse and the interfacing device are separated, and FIG. 4B is a perspective view illustrating that the interfacing device is inserted into the wireless mouse.

DETAILED DESCRIPTION OF THE INVENTION

An object of the present invention is to provide a wireless mouse system in which a receiver and a flash memory device can be integrated into an interfacing device.

Another object of the present invention is to provide a wireless mouse system in which a controller, which controls a receiver and a flash memory device integrated into an interfacing device, can be performed function of the receiver and the flash memory device smoothly.

Another object of the present invention is to provide a wireless mouse system in which an interfacing device, which a receiver and a flash memory device is integrated into, can be inserted in a wireless mouse so that increases portable and convenience.

Hereinafter, the preferred embodiments of the present invention will be explained in more detail with reference to the accompanying drawings.

Figure 1:
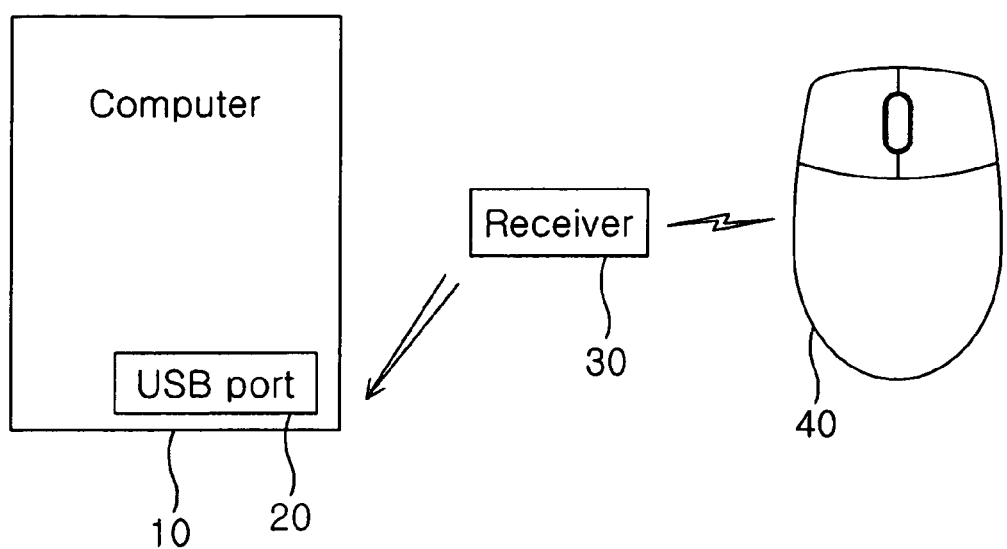
FIG. 1 is a block diagram illustrating the constitution of a wireless mouse according to the related art.
Figure 2:
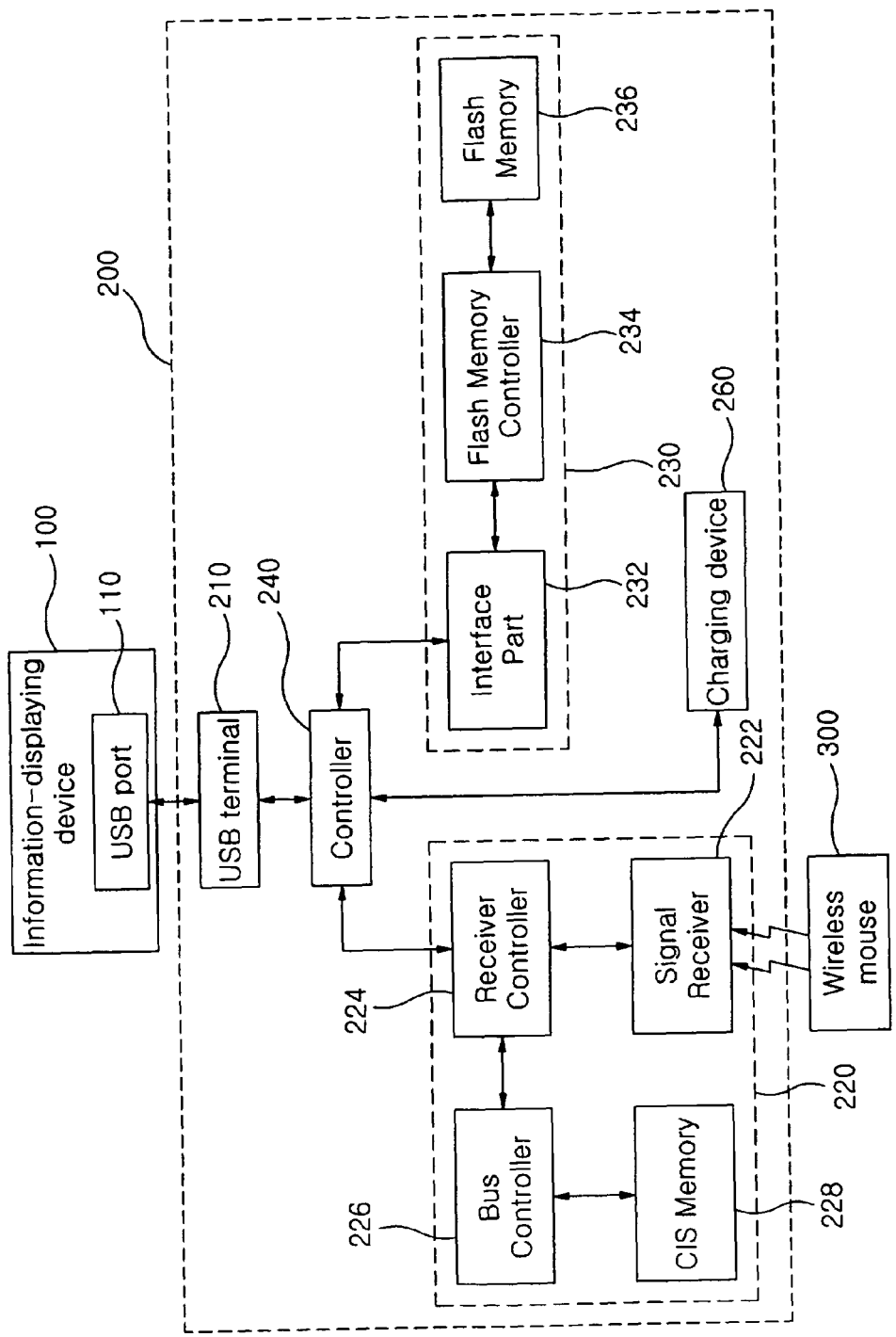
FIG. 2 is a block diagram illustrating the elements of the wireless mouse system according to the preferred embodiment of the present invention.
Figure 3:
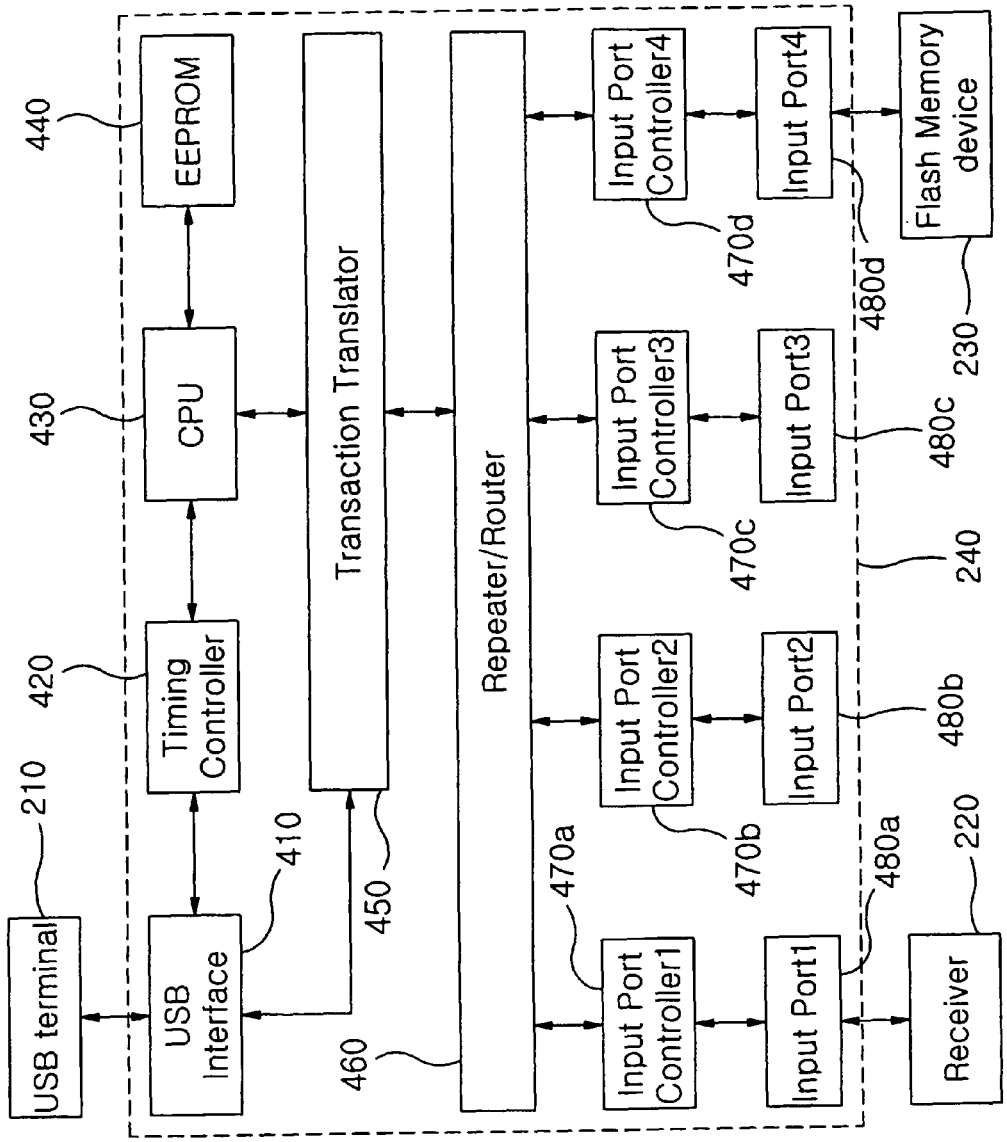
FIG. 3 is a block diagram illustrating the elements of the controller of FIG. 2.

FIG. 2 is a block diagram illustrating the elements of the wireless mouse system according to the preferred embodiment of the present invention. And, FIG. 3 is a block diagram illustrating the elements of the controller of FIG. 2.

Referring to FIG. 2, the wireless mouse system of the present invention comprises an information-displaying device 100, a wireless mouse 300 and an interfacing device 200.

The information-displaying device 100 is operated by OS, and operates programs of the information-displaying device 100 with the input data of the wireless mouse 300.

A USB port 110 is disposed on one end of the information-displaying device 100.

Usually, a computer can be connected to a keyboard, a monitor, a mouse, a printer, a modem, etc by USB. It is possible for one hundred twenty seven devices to be connected simultaneously to the computer. Also, when new peripheral equipments are connected to the computer, they can be recognized automatically, and conveniently connected without rebooting or set-up.

The USB port 110 receives operating signals of the wireless mouse 300 from the receiver 220, and transfers them to the information-displaying device 100. Also, the USB port 110 is used for exchanging data with a flash memory device 230. The USB port 110 is manufactured whereby a USB terminal 210 of the interfacing device 200 can be inserted therein.

The wireless mouse 300 can utilize RF, infrared ray or other local area communication method.

The wireless mouse 300 comprises a ball or an optical sensor which can sense the operation of the wireless mouse 300, such as mouse button click or mouse wheel rotation. The wireless mouse 300 transfers the signal corresponding to the operation thereof to the receiver 220 through an internal communication means corresponding to a local area communication means of the receiver 220. The wireless mouse 300 needs an independent power source for the operation thereof.

The interfacing device 200 comprises the USB terminal 210, the receiver 220, the flash memory device 230 and a controller 240.

The USB terminal 210 is a connector coupled to the USB port 110 disposed on the information-displaying device 100, and is configured to receive the electrical signals transferred from the USB port 110 by a conductor such as a metal.

The receiver 220 comprises a signal receiver 222, a receiver controller 224, a BUS controller 226 and a CIS (Card Information Structure) memory 228.

After receiving analog signals in the unit of packet, generated from the wireless mouse 300, the signal receiver 222 transforms the analog signals to digital signals, and transfers the digital signals to the receiver controller 224 in series.

The receiver controller 224 receives commands of the information-displaying device 100 through the controller 240, and performs control operations. Primarily, after deciding whether there exists an error in the digital signals transferred from the signal receiver 222, the receiver controller 224 processes the digital signals thereby generating the information-displaying device data.

The CIS memory 228 stores the data about the function and characteristic of the receiver 220.

The BUS controller 226 decodes the address BUS (not shown) and the data BUS (not shown) of the information-displaying device 100 for transferring the processed data in the receiver controller 224 to the information-displaying device 100 through the USB terminal 210 with using the data stored in the CIS memory 228.

The signal packet generated from the wireless mouse 300 includes the amount of movement, the direction of movement and the mouse button click, of the wireless mouse 300.

The flash memory device 230 comprises an interface part 232, a flash memory controller 234 and a flash memory 236.

The interface part 232 receives the packet transferred through the USB terminal 210, and output it to the flash memory controller 234. Also, the interface part 232 transforms the data outputted from the flash memory 236 into USB signals, and transfers the USB signals to the USB terminal 210.

The flash memory controller 234 is connected to the interface part 232 and the flash memory 236, and controls the data read/write of the flash memory 236.

The flash memory controller 234 recognizes the address included in the packet outputted from the interface part 232. Then, the flash memory controller 234 writes the data included in the packet on the corresponding address of the flash memory 236, or transfers the data read from the flash memory 236 to the interface part 232.

The controller 240 controls operation of the receiver 220 and/or the flash memory device 230 of the interfacing device 200, and transmits selectively a signal generated from the receiver 220 and/or the flash memory device 230 to the information-displaying device 100.

In detail, referring to FIG. 3, the controller 240 comprises a USB interface 410, a timing controller 420, a CPU 430, an EEPROM (Electrically Erasable and Programmable Read Only Memory) 440, a transaction translator 450, a repeater/router 460, a plurality of input port controllers 470a to 470d, and a plurality of input ports 480a to 480d.

The USB interface 410 is coupled to the USB port 110 disposed on the information-displaying device 100 through the USB terminal 210, and is configured to transmit the signals transferred from the receiver 220 or the flash memory device 230, or receive the electrical signals transferred from the information-display device 100 to the receiver 220 or the flash memory device 230.

The timing controller 420 sets up timing for operation of each device or transmission/receipt of various signals so that each device of the controller 240 is operated smoothly.

The CPU 430 controls the whole operation of each device of the controller 240.

The EEPROM 440 has a certain program, for example, a program for initial setting of the interfacing device 200.

Generally, the EEPROM is a nonvolatile memory device which safely memorizes data for a long time even without power, and records/erases once recorded data by electrically changing an electric charge of a device constituting a chip.

At the time of initial setting, the CPU 430 sets up an operation state of each device of the controller 240 by using information recorded in the EEPROM 440.

The transaction translator 450 is a main traffic control engine of the controller 240, and controls the moving velocity between down stream of inputting data to the interfacing device 200, and up stream of outputting data from the interfacing device 200.

The repeater/router 460 senses whether data is inputted to each input port 480a to 480d or not. For example, the repeater/router 460 senses the input ports 480a to 480d periodically, and notifies the CPU 430 an input port to which data is inputted so that CPU 430 controls the input port to which the data is inputted to smoothly transfer the data.

The input port controllers 470a to 470d control the input ports 480a to 480d so that data input/output can be made through the input ports 480a to 480d.

The input ports 480a to 480d are parts connected with the receiver 220 and the flash memory device 230.

Hereinafter, the operation of the interfacing device 200 will be described, focused on operation of the controller 240.

Assume that the receiver 220 is connected with the input port 1 480a, the flash memory device 230 is connected with the input port 4 480d, and the input ports 2 480b and 3 480c are not connected.

Only, each of the receiver 220 and the flash memory device 230 is not always connected to the input port 1 480a and the input port 4 480d, and may be connected with any of a plurality of input ports 480a to 480d.

First, to use the interfacing device 200, initial setting is made.

For this setting, the CPU 430 reads the initial setting program recorded in the EEPROM 440, and senses the connection state of each of the input port 1 480a and the input port 4 480d with the receiver 220 and the flash memory device 230.

Next, the CPU 430 blocks the input port 2 480b and input port 3 480c that are not connected with any device. That is, the CPU 430 blocks data input/output through the input port controller 2 470b and the input port controller 3 470c so that the input port 2 480b and the input port 3 480c are not sensed.

Also, the CPU 430 sets up a priority order between the input port 1 480a and the input port 4 480d. Especially, in case data are transferred/received through the input port 1 480a and the input port 4 480d at the same time, the priority order is to set up what data should be handled first.

Preferably, the priority order is set up for the input port 1 480a connected with the receiver 220 to be sensed prior to the input port 4 480d connected with the flash memory device 230.

Besides, the CPU 430 sets up operation of each device of the controller 240 by using initial setting information stored in the EEPROM 440.

Only, the present invention describes that the EEPROM 440 is included inside the controller 240, but the above described function can be performed by using external EEPROM. Also, the medium recording initial setting information is not limited to the EEPROM, and other memory capable of performing same function can be used.

As shown above, if the initial setting is completed, the interfacing device 200 can be operated normally.

For example, in case of using the wireless mouse system, the USB terminal 210 of the interfacing device 200 is connected with the USB port 110 of the information-displaying device 100.

This time, the repeater/router 460 regularly senses whether the data is inputted in the input port 1 480a or the input port 4 480d.

When a data about operation of the wireless mouse 300 is inputted in the input port 1 480a, the repeater/router 460 senses and transfers the data to the transaction translator 450. The transaction translator 450 transfers the data to the USB interface 410 in proper time considering data flow of the controller 240.

Subsequently, the data is transferred to the information-displaying device 100 through the USB interface 410.

However, in case the information-displaying device 100 inputs a signal requiring a data stored in the flash memory device 230, the CPU 430 sends a command to read the data stored in the flash memory device 230, to the input port controller 4 470d.

According to the command, the input port controller 4 470d makes the data stored in the flash memory device 230 transferred to the repeater/router 460 through the input port 4 480d. Then, the repeater/router 460 senses and transfers the data to the transaction translator 450. The transaction translator 450 transfers the data to the information-displaying device 100 through the USB interface 410 considering data flow of the controller 240.

The same method is applied in case of storing data of the information-displaying device 100 in the flash memory device 230.

On the other hand, if the receiver 220 senses data of the wireless mouse 230 while the data is transferred/received between the information-displaying device 100 and the flash memory device 230, the repeater/router 460 senses that the data is inputted in the input port 1 480a.

According to the priority order, the repeater/router 460 interrupts data transfer inputted/outputted through the input port 4 480d, and first transfers the data inputted through the input port 1 480a. Thus, the data of the wireless mouse 300 is first transferred to the information-displaying device 100.

Next, the repeater/router 460 resumes data transfer inputted/outputted through the input port 4 480d.

In another embodiment, in case the receiver 220 senses data of the wireless mouse 300 while the data is transferred/received between the information-displaying device 100 and the flash memory device 230, the data of the wireless mouse 300 is first transferred to the information-displaying device 100 in packet unit. And, the data of the flash memory device 230 is transferred in the middle that data packet of the wireless mouse 300 is transferred.

In this case, a user can use the wireless mouse 300 without inconvenience because the data of the flash memory device 230 is transferred within a second when the user cannot recognize that moving of the wireless mouse 300 is stopped. Therefore, data transfer can be made more smoothly.

By the above method, the data of the receiver 220 and the flash memory device 230 in one interfacing device 200 can be transferred to the information-displaying device 100 without conflict and damage, and the receiver 220 and the flash memory device 230 each can perform its function without error.

Also, the interfacing device 200 may further comprise a charging device (not shown) for charging the wireless mouse 300.

The interfacing device 200 is configured to be releasably inserted into the socket of the wireless mouse 300.

Hereinafter, the method of inserting the interfacing device 200 into the wireless mouse 300, and releasing the interfacing device 200 from the wireless mouse 300, will be explained.

Figure 4A:
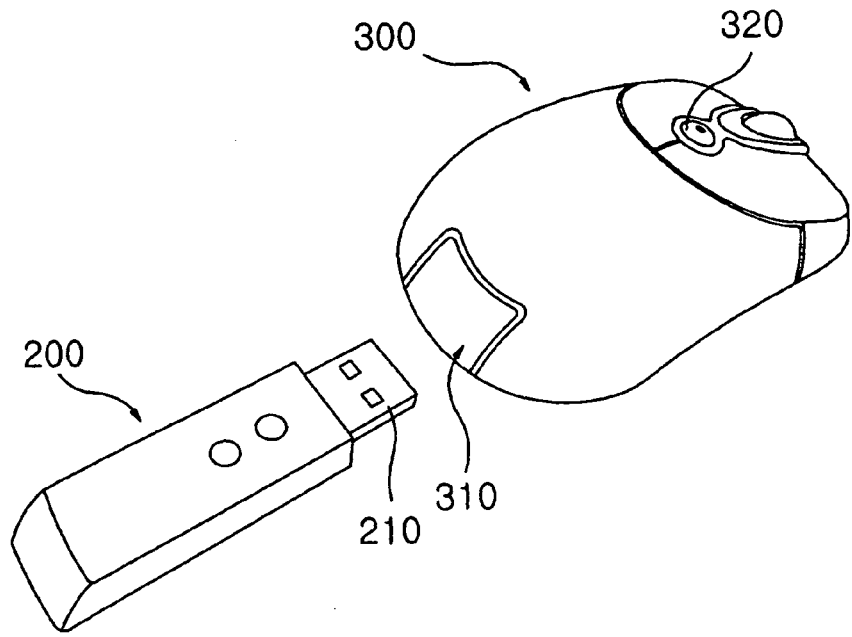
FIG. 4A and FIG. 4B is a perspective view illustrating the wireless mouse system of FIG. 2.
Figure 4B:
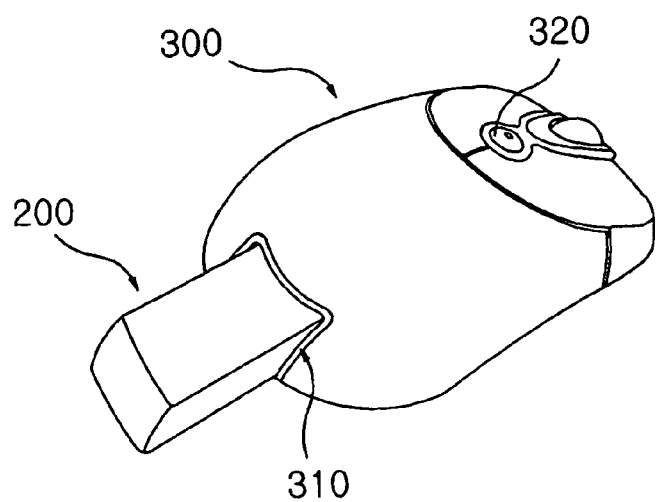

FIG. 4A and FIG. 4B is a perspective view illustrating the wireless mouse system of FIG. 2, FIG. 4A is a perspective view illustrating that the wireless mouse and the interfacing device are separated, and FIG. 4B is a perspective view illustrating that the interfacing device is inserted into the wireless mouse.

Referring to FIGS. 4A and 4B, an inlet part 310 is mounted on the rear surface of the wireless mouse 300, wherein the interfacing device 200 is inserted into the wireless mouse 300 through the inlet part 310.

In order to be connected to the USB port 110 of the information-displaying device 100, thereby serving wireless communication with the wireless mouse 300, the interfacing device 200 is separated from the wireless mouse 300 through the inlet part 310 as illustrated in FIG. 4A. The wireless mouse 300 is designed to release the interfacing device 200 when a release button 320 on the upper surface of the wireless mouse 300 is pushed.

In case that the interfacing device 200 is not used, the interfacing device 200 is retained in the socket of the wireless mouse 300 through the inlet part 310 as illustrated in FIG. 4B. The wireless mouse 300 is designed to fix the interfacing device 200 therein when the interfacing device 200 is pushed into the inlet part 310.

From the above preferred embodiments for the present invention, it is noted that modifications and variations can be made by a person skilled in the art in light of the above teachings. Therefore, it should be understood that changes may be made for a particular embodiment of the present invention within the scope and the spirit of the present invention outlined by the appended claims.

An embodiment may be achieved in a whole or in parts by the wireless mouse system comprises a wireless mouse and an interfacing device with a USB terminal, electrically communicated with a USB port of a information-displaying device. The interfacing device comprises a receiver receiving a signal data transferred wirelessly from the wireless mouse, and transferring the signal data to the information-displaying device, a flash memory device exchanging data with the information-displaying device through the USB terminal and a controller controlling the receiver and the flash memory device, and transferring selectively the signal of the receiver and/or the flash memory device to the information-displaying device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless mouse system, comprising:
   a wireless mouse; and
   an interfacing device having a USB terminal, wherein the interfacing device comprises:
      a receiver configured to receive data transferred wirelessly from the wireless mouse;
      a flash memory device configured to exchange data through the USB terminal; and
      a controller configured to control the receiver and the flash memory device,
      wherein the controller comprises:
         a plurality of input ports including a receiver input port and a flash memory device input port;
         a repeater/router configured to sense signals input to the plurality of input ports;
         a transaction translator configured to control a signal transmission velocity; and
         a USB interface configured to transmit the signals sensed by the repeater/router to the USB terminal in accordance with the signal transmission velocity.

2. The wireless mouse system according to claim 1, wherein the controller further comprises:
   a EEPROM recorded with information used for controller initial setup; and
   a CPU configured to initialize the controller with the information recorded in the EEPROM.

3. The wireless mouse system according to claim 2, wherein the CPU is configured to block access of input ports not connected to the receiver or the flash memory device during the controller initial setup.

4. The wireless mouse system according to claim 2, wherein the CPU is configured to recognize input ports connected to the receiver or the flash memory device during the controller initial setup, and to set a priority of the connected input ports.

5. The wireless mouse system according to claim 4, wherein the CPU is configured to set input port priorities including setting a priority of the receiver input port higher than a priority of the flash memory device input port.

6. The wireless mouse system according to claim 5, wherein the repeater/router is configured to transmit signals from the receiver input port and the flash memory device input port to the transaction translator according to the input port priorities.

7. The wireless mouse system according to claim 2, wherein the controller further comprises:
   a timing controller configured to control operational timing of the controller; and
   a plurality of input port controllers, each input port controller configured to control operations of a corresponding one of the plurality of input ports.

8. The wireless mouse system according to claim 1, wherein the interfacing device is configured to be inserted in and separated from an inside of the wireless mouse.

9. The wireless mouse system according to claim 1, wherein the receiver comprises:
   a CIS (card information structure) memory configured to store data about the receiver;
   a signal receiver configured to receive the data transferred wirelessly from the wireless mouse;
   a receiver controller configured to convert the data received by the signal receiver into data for an information-displaying device; and
   a bus controller configured use the data of the CIS memory to transfer the converted data of the receiver controller to the information-displaying device via the USB terminal.

10. The wireless mouse system according to claim 1, wherein the flash memory device comprises:
    a flash memory configured to store the data;
    an interface part configured to convert the data stored in the flash memory into a USB signal, to transfer the USB signal to the USB terminal, and to receive a signal generated from an information-displaying device; and
    a flash memory controller configured to control data reading/writing of the flash memory.

11. The wireless mouse system according to claim 1, wherein the interfacing device further comprises:
    a charging device configured to charge the wireless mouse.

12. The wireless mouse system according to claim 1, wherein the interfacing device is electrically communicated to a USB port of an information-displaying device.

13. The wireless mouse system according to claim 12, wherein the receiver is configured to transfer the wirelessly received data to an information-displaying device.

14. The wireless mouse system according to claim 1, wherein the controller is configured to selectively transfer the data received by the receiver and the data of the flash memory device to an information-displaying device.

15. The wireless mouse according to claim 1, wherein the flash memory device is configured to exchange the exchanged data with an information-displaying device through the USB terminal.

16. The wireless mouse according to claim 1, wherein the controller is configured to control the receiver and the flash memory device to first transfer the data received by the receiver in a packet unit, and transfer the data of the flash memory device within a portion of the data packet.

* * * * *